United States Patent
Nakao et al.

(10) Patent No.: US 11,157,126 B2
(45) Date of Patent: Oct. 26, 2021

(54) CAPACITIVE TOUCH PANEL THAT DETECTS THE APPROACH OF THE USER

(71) Applicants: NORITAKE CO., LIMITED, Aichi (JP); NORITAKE ITRON CORPORATION, Mie (JP)

(72) Inventors: Takehiro Nakao, Mie (JP); Kazuya Nasu, Mie (JP)

(73) Assignees: NORITAKE CO., LIMITED, Aichi (JP); NORITAKE ITRON CORPORATION, Mie (JP)

(*) Notice: Subject to any disclaimer, the term of this patent is extended or adjusted under 35 U.S.C. 154(b) by 0 days.

(21) Appl. No.: 16/822,371

(22) Filed: Mar. 18, 2020

(65) Prior Publication Data
US 2020/0333920 A1    Oct. 22, 2020

(30) Foreign Application Priority Data
Mar. 29, 2019   (JP) ............................. JP2019-068108

(51) Int. Cl.
*G06F 3/042*   (2006.01)
*G06F 3/044*   (2006.01)

(52) U.S. Cl.
CPC .......... *G06F 3/0448* (2019.05); *G06F 3/0446* (2019.05)

(58) Field of Classification Search
CPC .............................. G06F 3/0448; G06F 3/0446
USPC ......................................................... 345/174
See application file for complete search history.

(56) References Cited

U.S. PATENT DOCUMENTS

| | | | |
|---|---|---|---|
| 2011/0290631 A1* | 12/2011 | Kuriki | G06F 3/0446 200/600 |
| 2012/0327019 A1* | 12/2012 | Takao | G06F 3/044 345/174 |
| 2015/0177867 A1* | 6/2015 | Chung | G06F 3/0446 345/174 |
| 2017/0083160 A1* | 3/2017 | Hashida | G02F 1/13338 |
| 2017/0168608 A1* | 6/2017 | Kim | G06F 3/044 |
| 2017/0228052 A1* | 8/2017 | Nakamura | G06F 3/0446 |
| 2017/0336907 A1* | 11/2017 | Jeong | G06F 3/0412 |
| 2019/0114006 A1* | 4/2019 | Sakaue | G06F 3/0448 |

FOREIGN PATENT DOCUMENTS

WO    2015/137477 A1    3/2015

* cited by examiner

*Primary Examiner* — Jonathan M Blancha
(74) *Attorney, Agent, or Firm* — Hedman & Costigan, P.C.; James V. Costigan; Kathleen A. Costigan

(57) ABSTRACT

A touch panel is formed by laminating: a glass substrate having a touch surface; an X-axis sensor unit having parallel patterns, each of which having diamond-shaped X-axis lattices 10A and 10B aligned in an X-axis direction; an Y-axis sensor unit having parallel patterns each of which having Y-axis lattices 14A and 14B aligned in a Y-axis direction; and an insulation layer arranged between the X-axis sensor unit and the Y-axis sensor unit. The X-axis lattices and the Y-axis lattices are not overlapped when seen from a side of the touch surface. A gap 17 is formed between a frame line 10a of the X-axis lattice and a frame line 14a of the Y-axis lattice. A protrusion part 12 extended parallel to a lattice side of a fine lattice from the frame line 10a of the X-axis lattices 10A and 10B is arranged in the gap 17.

8 Claims, 8 Drawing Sheets

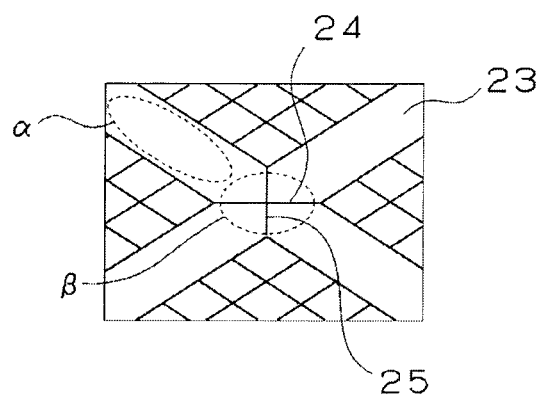
Fig. 8A
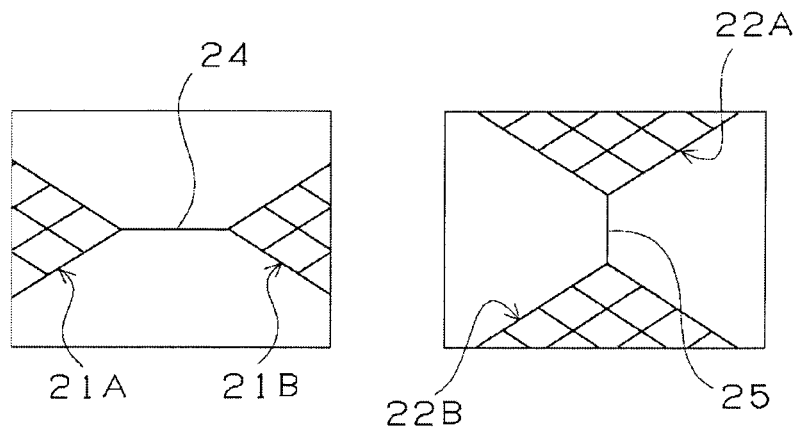
Fig. 8B
Fig. 8C

CAPACITIVE TOUCH PANEL THAT DETECTS THE APPROACH OF THE USER

CROSS-REFERENCE TO RELATED APPLICATION

This application claims priority to Japanese Patent Application No. 2019-068108 filed on Mar. 29, 2019, the entire contents of which are incorporated by reference herein.

BACKGROUND OF THE INVENTION

Field of the Invention

The present disclosure relates to a capacitive touch panel that detects approach of a finger of a user to any position on a touch surface (X-Y plane), based on a change in capacitance, in particular relates to a capacitive touch panel having a sensor electrode on a glass substrate.

Background Art

In household electrical appliances, audio visual appliances, personal computer equipment, office automation equipment, industrial machines or other electronic devices, a projected capacitive touch panel is used as one of input devices to each appliance. The projected capacitive touch panel is provided with sensor electrodes arranged with a predetermined pattern in an X-axis direction and a Y-axis direction.

A specific structure of the conventional touch panel provided with a sensor electrode in the X-axis direction detection arranged on one glass substrate and a sensor electrode for the Y-axis direction detection arranged on the other glass substrate, wherein the sensor electrode in the X-axis direction and the sensor electrode in the Y-axis direction are interposed between the two glass substrates, has been known. A pattern of the sensor electrode in which diamond-shaped lattices are aligned along a longitudinal direction (Y) and a lateral direction (X) (hereinafter, also referred to as a diamond pattern) has been disclosed, for example, in WO 2015/137477.

The structure of the sensor electrode of the conventional diamond pattern is described with reference to FIG. 7 and FIGS. 8A through 8C. FIG. 7 is an enlarged view of the sensor electrode when a touch panel is seen from a touch surface (plane view). As shown in FIG. 7, a plurality of X-axis lattices 21 is aligned in the X-axis direction and a plurality of Y-axis lattices 22 is aligned in the Y-axis direction. Each of the lattices 21 and 22 is formed by fine lattices. The fine lattice is formed of a metal thin film. In FIG. 7, the Y-axis lattice 22 is illustrated with a hatching for the convenience of explanation. In this touch panel, the X-axis lattice 21 and the Y-axis lattice 22 are arranged with some gap in order to be electrically separated to each other. Thus, as shown in FIG. 7, the X-axis lattice 21 and the Y-axis lattice 22 are not overlapped with each other in a lamination direction, so that a gap 23 is formed between the X-axis lattice 21 and the Y-axis lattice 22. The metal thin film is not provided in the gap 23, and thereby the transmittance thereof is higher than those of the lattices 21 and 22.

FIG. 8A shows an enlarged view of a D-part in FIG. 7. FIG. 8B shows the X-axis sensor unit in FIG. 8A, and FIG. 8C shows the Y-axis sensor unit in FIG. 8B. As shown in FIG. 8B, the X-axis lattices 21A and 21B adjacent to each other in the X-axis direction are connected through a connection part 24 extended parallel to the X-axis direction. As shown in FIG. 8C, the Y-axis lattices 22A and 22B adjacent to each other in the Y-axis direction are connected through a connection part 25 extended parallel to the Y-axis direction. The connection part 24 is connected to the X-axis lattice 21 to be extended in a direction different from directions of the lattice sides of the X-axis lattice 21, and the connection part 25 is connected to the Y-axis lattice 22 to be extended in a direction different from directions of lattice sides of the Y-axis lattice 22. As shown in FIG. 8A, the connection part 24 and the connection part 25 cross to be orthogonal to each other. In FIG. 8A, a part where the connection parts are provided (β-part) has the transmittance higher than those of the X-axis lattice 21 and the Y-axis lattice 22, and lower than that of a part (α-part) other than the β-part.

As described above, in the conventional touch panel having the diamond pattern, the transmittance of the X-axis lattice 21 and the Y-axis lattice 22, the transmittance of the α-part of the gap 23, and the transmittance of the β-part of the gap 23 are different from each other. Thus, the connection parts 24 and 25 are conspicuous, and thereby a user might unfortunately recognize the presence of the sensor unit easily.

SUMMARY OF THE INVENTION

An object of the present invention is, in order to solve such a problem, to provide a capacitive touch panel having a sensor unit with a diamond pattern, which is hardly conspicuous.

A capacitive touch panel of the present invention has: a glass substrate having a touch surface; an X-axis sensor unit having patterns arranged parallel to each other, each of the patterns having diamond-shaped X-axis lattices aligned in an X-axis direction; an Y-axis sensor unit having patterns arranged parallel to each other, each of the patterns having Y-axis lattices, each of which has the same shape as the X-axis lattice, aligned in a Y-axis direction orthogonal to the X-axis direction; and an insulation layer arranged between the X-axis sensor unit and the Y-axis sensor unit. The capacitive touch panel is formed by the glass substrate, the X-axis sensor unit, the Y-axis sensor unit, and the insulation layer laminated to each other. The X-axis lattices and the Y-axis lattices are arranged in a matrix manner not to be overlapped with each other such that a gap is formed between a frame line of the X-axis lattice and a frame line of the Y-axis lattice, in a plane view seen from a side of the touch surface. Each of the X-axis lattice and the Y-axis lattice is formed by fine lattices formed of a metal thin film. A metal thin film extended parallel to a lattice side of the fine lattice from the frame line of the X-axis lattice or the Y-axis lattice is arranged in the gap.

The X-axis lattices adjacent to each other in the X-axis direction may be connected by an X-axis connection part in the X-axis sensor unit, and the Y-axis lattices adjacent to each other in the Y-axis direction may be connected by a Y-axis connection part in the Y-axis sensor unit. The X-axis connection part may be formed of a metal thin film parallel to the lattice side of the fine lattice, and the Y-axis connection part may be formed of a metal thin film parallel to the lattice side of the fine lattice.

The X-axis lattice may have a missing part in which at least a part of the lattice side of the fine lattice is missing, at a position overlapped with the Y-axis connection part in a lamination direction.

The Y-axis lattice may have a missing part in which at least a part of the lattice side of the fine lattice is missing, at a position overlapped with the X-axis connection part in a lamination direction.

The metal thin films arranged in the gap may be formed with the same pitch and the same line width as the metal thin films forming the fine lattices.

A plurality of cut parts in which a part of at least one lattice side of the fine lattices in the X-axis lattice or the Y-axis lattice is cut, may be formed, so that inner spaces of the fine lattices adjacent to each other are communicated with each other.

The cut parts may be arranged such that air in the inner spaces of the fine lattices flows toward one side in the X-axis direction or the Y-axis direction.

The capacitive touch panel of the present invention has the diamond-shaped X-axis lattices aligned in the X-axis direction and the diamond-shaped Y-axis lattices aligned in the Y-axis direction, the X-axis lattices and the Y-axis lattices are arranged in a matrix manner, and the metal thin film extended parallel to the lattice side of the fine lattice from the frame line of the X-axis lattice or the Y-axis lattice is arranged in the gap formed between the frame line of the X-axis lattice and the frame line of the Y-axis lattice. With this, the gap between the lattices is filled with the metal thin film, and thereby the transmittance of the gap and the transmittance of the lattice are substantially identical. As a result, since the transmittance is substantially uniform in a whole of the sensor unit, the sensor unit becomes inconspicuous and thereby the appearance quality of the capacitive touch panel can be improved.

The X-axis connection part is formed of a metal thin film parallel to the lattice side of the fine lattice and the Y-axis connection part is formed of a metal thin film parallel to the lattice side of the fine lattice. With this, the connection part becomes inconspicuous compared to a configuration in which a connection part is extended in a direction different from directions of the lattice sides.

The X-axis lattice or the Y-axis lattice has the missing part in which at least a part of the lattice side of the fine lattice is missing, at a position overlapped with the Y-axis connection part or the X-axis connection part in the lamination direction. With this, the metal thin films are hardly overlapped in the lamination direction, and thereby the transmittance and the reflectance can be uniform in the whole of the sensor unit.

The metal thin film arranged in the gap is formed with the same pitch and the same line width as the metal thin film forming the fine lattices. With this, the gap becomes further inconspicuous.

A plurality of the cut parts in which a part of at least one lattice side of the fine lattice in the X-axis lattice or the Y-axis lattice is cut, is formed, so that the inner spaces of the fine lattices adjacent to each other are communicated with each other. With this, the cut parts are served as an air discharge part, and thereby an air bubble is prevented from being generated in the fine lattice when bonding the sensor unit and the glass substrate. As a result, malfunction or the like due to the air bubble can be avoided, and the transmittance can be uniform and high in the whole of the sensor unit.

The cut parts are arranged such that air in the inner spaces of the fine lattices flows toward one side in the X-axis direction or the Y-axis direction. With this, the air is discharged smoothly by a roller processing after bonding, and thereby the air bubble is prevented from being generated.

BRIEF DESCRIPTION OF THE DRAWINGS

FIG. 8A, FIG. 8B and FIG. 8C are enlarged views illustrating a boundary between the X-axis lattice and the Y-axis lattice shown in FIG. 7.

DETAILED DESCRIPTION OF THE EMBODIMENTS

Figure 1A:
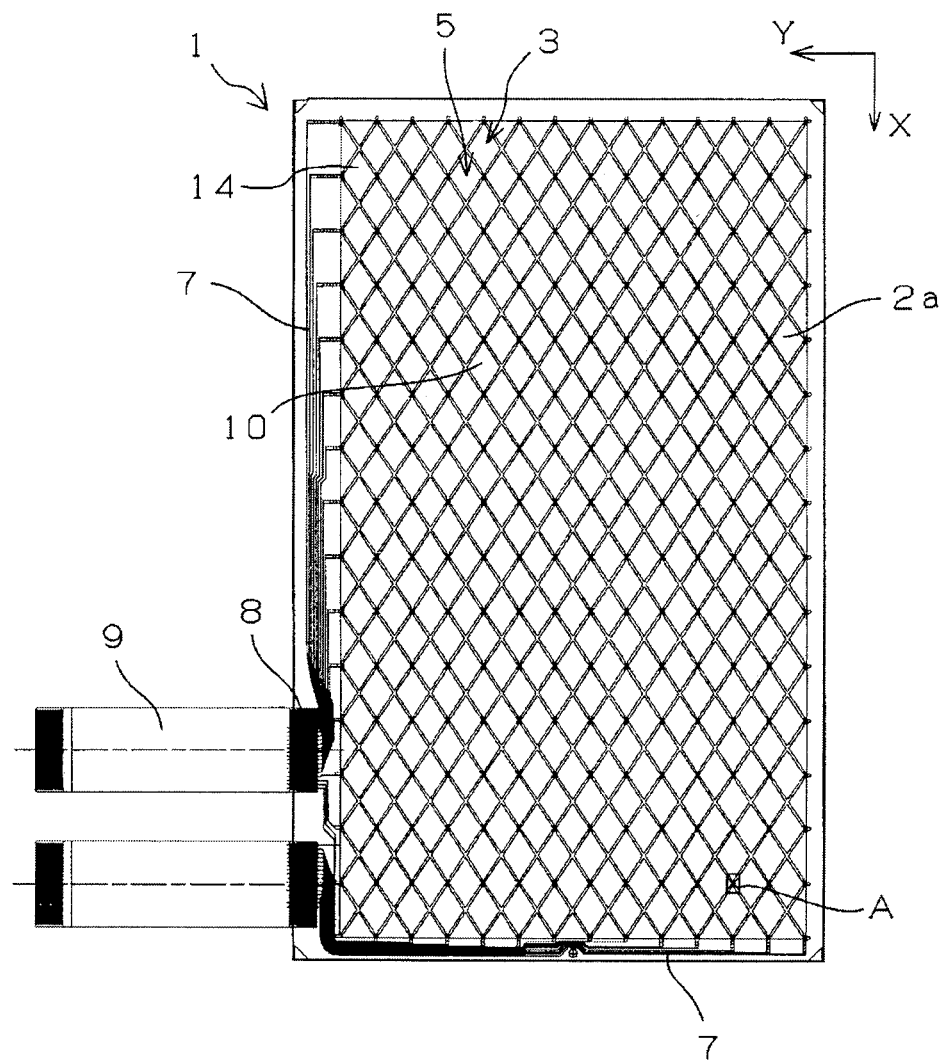
FIG. 1A and FIG. 1B are a plane view and a side view illustrating one example of a capacitive touch panel of the present invention.
Figure 1B:
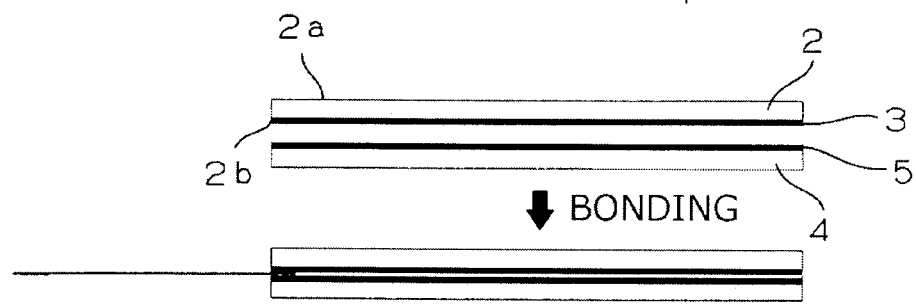

One example of a capacitive touch panel of the present invention is described with reference to FIGS. 1A and 1B. FIG. 1A is a plane view illustrating the capacitive touch panel, and FIG. 1B is a side view thereof. As shown in FIG. 1B, a capacitive touch panel 1 is provided with a first translucent glass substrate 2 having an X-axis sensor unit 3 for X-axis direction detection, and a second translucent glass substrate 4 having a Y-axis sensor unit 5 for Y-axis direction detection. The capacitive touch panel 1 has a lamination structure in which the first glass substrate 2 and the second glass substrate 4 are bonded to each other. A surface of the first glass substrate 2 is served as a touch surface 2a. The X-axis sensor unit 3 is arranged on an opposite surface 2b opposite to the touch surface 2a. The Y-axis sensor unit 5 is arranged on one surface of the second glass substrate 4. The X-axis sensor unit 3 and the Y-axis sensor unit 5 are interposed between the two glass substrates so as to face each other. Any glass substrate is not interposed between the two sensor units, so that a gap between the sensor units is remarkably small compared to a configuration in which a glass substrate is interposed between the two sensor units.

An external connection terminal 8 is connected to a sensor electrode of each sensor unit via a wiring 7. Flexible printed circuits (FPC) 9 are connected to the external connection terminal 8. A controller (not shown) that detects a touch is connected via the FPC 9. A metal lead frame may be adopted for improving environment resistance, instead of the FPC 9. The capacitive touch panel of the present invention uses a change in capacitance of the electrode caused by electrostatic coupling between the sensor electrode and a finger. A detailed detection procedure in the controller may adopt a known procedure.

Figure 2:
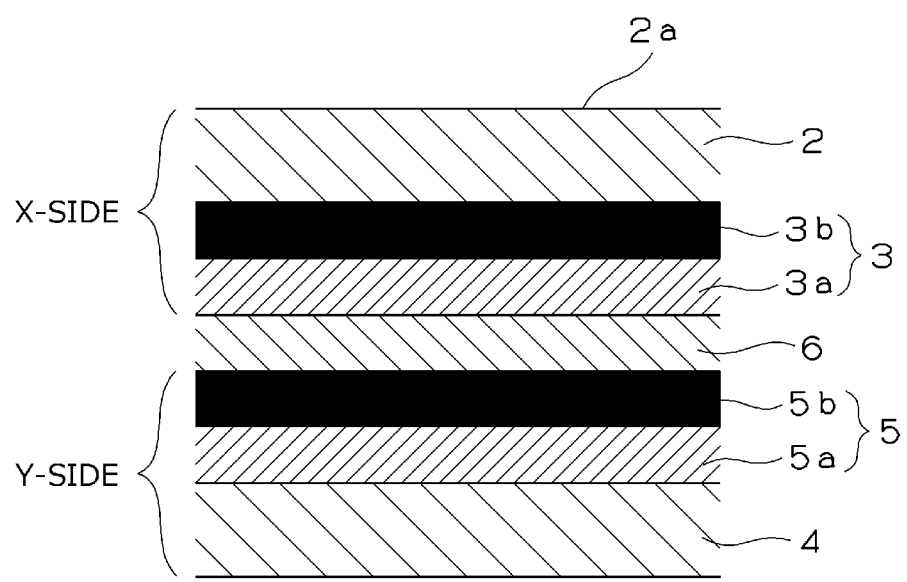
FIG. 2 is a schematic view illustrating an enlarged section of the touch panel shown in FIGS. 1A and 1B.

FIG. 2 is a schematic view illustrating an enlarged section of the touch panel. As shown in FIG. 2, the X-axis sensor unit 3 is provided with an intermediate layer 3b arranged on the opposite surface opposite to the touch surface 2a of the first glass substrate 2, and a sensor electrode 3a formed of a metal thin film and arranged on the intermediate layer 3b. The Y-axis sensor unit 5 is provided with a sensor electrode 5a formed of a metal thin film and arranged on one surface (a surface at a side of the first glass substrate) of the second glass substrate 4, and an intermediate layer 5b arranged on the sensor electrode 5a. When seen from the touch surface 2a, the metal thin film is arranged below the intermediate layer in each sensor unit. With this, a reflectance with respect to a visible light is decreased, so that the visibility is secured.

The metal thin film forming the sensor electrodes 3a and 5a is formed by a known thin film forming method using a material of aluminum (Al), Al alloy, niobium, molybdenum, gold, silver, copper, or the like. Of these thin films, Al thin film is preferable because of its superior environment resistance and low cost.

Each of the intermediate layers 3b and 5b is a thin film including at least one of metals selected from a group (1) of chromium (Cr), molybdenum (Mo), and tungsten (W). The intermediate layers 3b and 5b absorb an incident light due to the interference of a visible light and thereby look black (black layer). A switch part looks black when seen from a side of the touch surface 2a, so that reflection can be suppressed. The intermediate layer may be formed by means of sputtering or the like, similar to the Al thin film described above. Further, it is preferable that the intermediate layer includes a predetermined amount of at least one of oxides selected from a group (2) of aluminum oxide (for example, $Al_2O_3$), and titanium oxide (for example, $TiO_2$). Since the intermediate layer includes the predetermined amount of the oxide, the reflectance thereof is further decreased. A preferable intermediate layer is a composite layer of molybdenum and $Al_2O_3$. A thickness of the intermediate layer is preferably set to 5-500 nm, more preferably set to 20-200 nm.

Each of the first glass substrate 2 and the second glass substrate 4 is a translucent insulation substrate formed of soda-lime glass, quarts glass, borosilicate glass, alkali-free glass that does not contain alkali components, or the like. Soda-lime glass is preferable due to its high transmittance and very low cost, such glass being used in window glass for generic building materials. A thickness of each of the glass substrates is set to 0.5-5 mm, preferably set to 0.5-3.0 mm.

As shown in FIG. 2, an insulation layer 6 for insulating the sensor electrodes is arranged between the X-axis sensor unit 3 and the Y-axis sensor unit 5, specifically the sensor electrode 3a at an X-side and the intermediate layer 5b at a Y-side. A thickness of the insulation layer is preferably set to 50-500 μm. In a case in which the thickness of the insulation layer exceeds 500 μm, a gap between the sensor electrodes is too large, so that a difference in sensitivity is caused between the X-axis sensor unit and the Y-axis sensor unit.

In FIGS. 1A and 1B and FIG. 2, the X-axis sensor unit is arranged on the first glass substrate, which is arranged at a side of the touch surface, however a configuration in which the Y-axis sensor unit is arranged on the first glass substrate and the X-axis sensor unit is arranged on the second glass substrate may be adopted.

As shown in FIG. 1A, each of the sensor units 3 and 5 of the touch panel 1 is patterned with a diamond pattern. Specifically, the X-axis sensor unit 3 is formed by patterns arranged parallel to each other, each of the patterns has diamond-shaped X-axis lattices 10 linearly aligned in the X-axis direction. The Y-axis sensor unit 5 is formed by patterns arranged parallel to each other, each of the patterns has Y-axis lattices 14, each of which is formed in the same shape as the X-axis lattice 10, linearly aligned in the Y-axis direction orthogonal to the X-axis direction. The X-axis sensor unit 3 and the Y-axis sensor unit 5 are arranged not to be overlapped with each other on the X-Y plane (plane view). The X-axis lattices 10 and the Y-axis lattices 14 are arranged in a matrix manner. An inside of each of the X-axis lattice 10 and the Y-axis lattice 14 is formed by fine lattice portions (fine lattice).

Figure 3A:
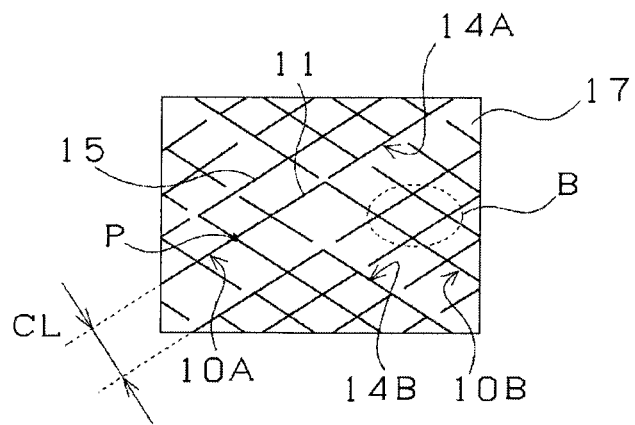
FIG. 3A, FIG. 3B and FIG. 3C are enlarged views illustrating a boundary between an X-axis lattice and a Y-axis lattice shown in FIG. 1A.
Figure 3B:
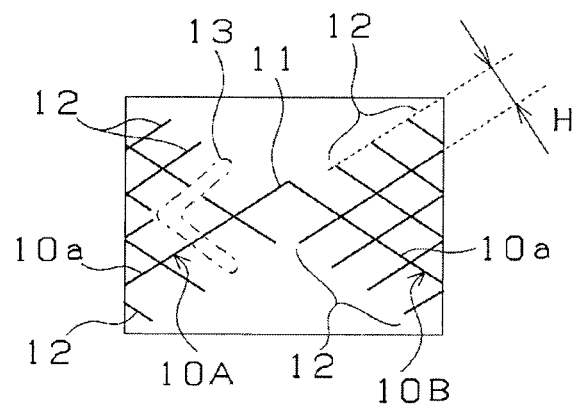
Figure 3C:
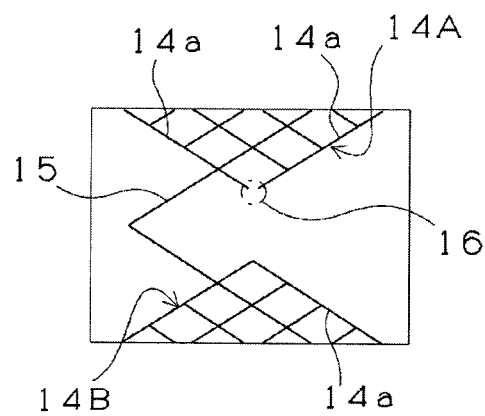

FIGS. 3A to 3C are enlarged views illustrating a boundary between the X-axis lattice and the Y-axis lattice in the touch panel of the present invention. FIG. 3A is an enlarged view of A-part in FIG. 1A. FIG. 3B illustrates only the X-axis sensor unit and FIG. 3C illustrates only the Y-axis sensor unit. FIGS. 3A to 3C correspond to FIGS. 8A to 8C illustrating the conventional configuration, respectively.

As shown in FIG. 3A, a gap 17 is formed between the X-axis lattice 10A and the Y-axis lattice 14B. A width CL of the gap 17 (distance between a frame line of the X-axis lattice and a frame line of the Y-axis lattice) is constant in a whole of the sensor unit. For example, the width CL is set to 10-600 μm. In the conventional configuration, the difference in transmittance is caused between the gap and the diamond lattice and thereby the connection part, the gap and the like are conspicuous (see FIGS. 8A to 8C). Against this, in the present invention, the metal thin film extended from the frame line of the diamond lattice to be parallel to a lattice side thereof is arranged to fill the gap, and thereby the transmittance of the gap and the transmittance of the diamond lattice are substantially identical.

The X-axis lattice is described with reference to FIG. 3B. Each of the X-axis lattice 10A and the X-axis lattice 10B is formed in a diamond shape defined by a frame line 10a. An inside of the frame line 10a is formed by fine lattices. The fine lattice is formed of a metal thin film having a predetermined pitch and a predetermined line width as described below. Each of the X-axis lattice 10A and the X-axis lattice 10B has a protrusion parts 12 protruded from the frame line 10a to an outside thereof. The protrusion part 12 is formed on an extension line of a lattice side of the fine lattice to be parallel to the lattice side of the fine lattice. The protrusion parts 12 are formed with the same pitch and the same line width as those of the fine lattice, except a missing part described below. A length H of the protrusion part 12 is not especially limited, however it is preferably set to 60-95% of the width CL of the gap, more preferably set to 70-90% of the width CL.

The X-axis lattice 10A and the X-axis lattice 10B adjacent to each other in the X-axis direction are connected through a connection part 11. The connection part 11 is formed by a certain protrusion part 12 parallel to the lattice side of the fine lattice. The connection part 11 and the protrusion part 12 are formed of a metal thin film similar to the fine lattice, specifically formed by the sensor electrode and the intermediate layer described above. The connection part 11 is formed asymmetrically with respect to a center line of the X-axis lattice in the X-axis direction. The X-axis lattice 10A has a missing part 13 in which a part of the lattice side of the fine lattice is missing, at a position overlapped with a connection part 15 (see FIG. 3C) in the lamination direction.

The Y-axis lattice is described with reference to FIG. 3C. Each of the Y-axis lattice 14A and the Y-axis lattice 14B is formed in a diamond shape defined by a frame line 14a. An inside of the frame line 14a is formed by fine lattices similar to the X-axis lattice. The Y-axis lattice 14A and the Y-axis lattice 14B adjacent to each other in the Y-axis direction are connected through the connection part 15. The connection part 15 is formed to be parallel to a lattice side of the fine lattice, and is formed of the metal thin film similar to the fine lattice, specifically formed by the sensor electrode and the intermediate layer described above. The connection part 15 is formed asymmetrically with respect to a center line of the Y-axis lattice in the Y-axis direction. The Y-axis lattice 14A has a missing part 16 in which a part of the lattice side of the fine lattice is missing, at a position overlapped with the connection part 11 (see FIG. 3B) in the lamination direction. In the configuration shown in FIG. 3C, the missing part 16 is arranged on the frame line 14a.

In order to accurately detect the capacitance of the X-axis sensor unit and the capacitance of the Y-axis sensor unit, it is preferable that the X-axis sensor electrode and the Y-axis sensor electrode are arranged not to be overlapped with each other in the lamination direction. From such a viewpoint, as shown in FIGS. 3B and 3C, the X-axis lattice has the missing part 13 at the position overlapped with the Y-axis connection part, and the Y-axis lattice has the missing part 16 at the position overlapped with the X-axis connection part. With this, the detection accuracy can be improved, and the transmittance and the reflectance without deviation in a whole of the sensor units can be obtained. In the configuration shown in FIG. 3A, the four lattices 10A, 10B, 14A and 14B adjacent to each other on the X-Y plane are not overlapped except on an intersection P between the frame line of the X-axis lattice 10A and the connection part 15. Further, it is preferable that an intersection between the X-axis sensor unit and the Y-axis sensor unit is not located on the gap 17.

In the configuration shown in FIGS. 3A to 3C, each of the X-axis lattices 10A and 10B of the X-axis sensor unit has the protrusion part 12, however each of the Y-axis lattices 14A and 14B of the Y-axis sensor unit may have a protrusion part instead of the configuration in which each of the X-axis lattices 10A and 10B has the protrusion part 12.

Figure 4:
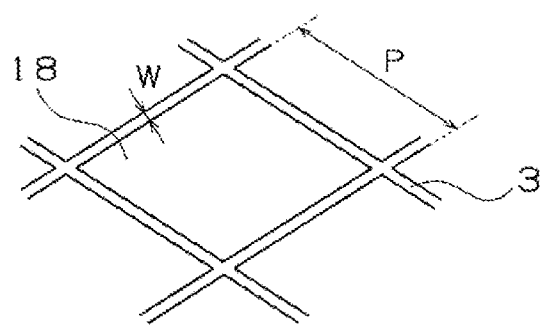
FIG. 4 is an enlarged view illustrating a fine lattice forming the X-axis lattice shown in FIGS. 3A and 3B.

FIG. 4 is an enlarged view illustrating a part of the fine lattice. The lattice portion is formed by the sensor electrode and the intermediate layer laminated in the order described above. An opening 18 is formed between the lattices, and the sensor electrode and the intermediate layer are not formed in the opening 18. The lattice portion is formed by very fine lattices and thereby the lattice portion is served as a translucent part that looks transparent at a glance. The lattice portion typically has a line width W of 3-50 μm and a line pitch P of 0.2-1 mm.

The sensor electrode of each of the sensor units is formed of a metal thin film. For example, in a case in which the metal thin film is the Al thin film, the Al thin film is formed by a vacuum process such as sputtering or vacuum deposition, using an Al sold target (deposition material). A wiring 7 (see FIG. 1A) is formed integrally with the sensor electrode at the same time. Sputtering is more preferable as the vacuum process because uniform film can be formed. Sputtering is a method for forming the thin film by causing accelerated argon ions to collide with a solid target, and causing the atoms or molecules that are emitted from a surface of the target to adhere to the glass substrate.

A method for processing the Al thin film into a predetermined shape such as a lattice is not especially limited, however a known photo resolution technique is preferably adopted because it can form the wiring connected to the sensor electrode and the fine lattice portion described above precisely. For example, a configuration may be adopted, in which, after the Al thin film is formed by means of sputtering or vacuum deposition, a mask layer of an etching pattern is formed by means of screen printing using a resist material, and then wet etching using a predetermined etchant is applied to the Al thin film, so that fine wiring is formed. A thickness of the Al thin film is preferably set to 100-5000 nm.

The insulation layer 6 (see FIG. 2) is formed by an optical clear adhesive (OCA) or an optical clear resin (OCR). The touch panel of the present invention is formed by a method of bonding the OCA to one of the sensor electrode 3a and the intermediate layer 5b and then bonding the other sensor substrate, or a method of filling the OCR on one of the sensor electrode 3a and the intermediate layer 5b and then bonding the other sensor substrate. After bonding the substrates, a roller processing is applied to the substrates toward one side in the X-axis direction or the Y-axis direction. When the OCA is bonded or the OCR is filled, an air bubble might be sealed in the fine lattice because the air bubble is not discharged due to the convex and concave (level difference) of the Al thin film. As a result, failure or malfunction due to the air bubble might be caused.

Figure 5:
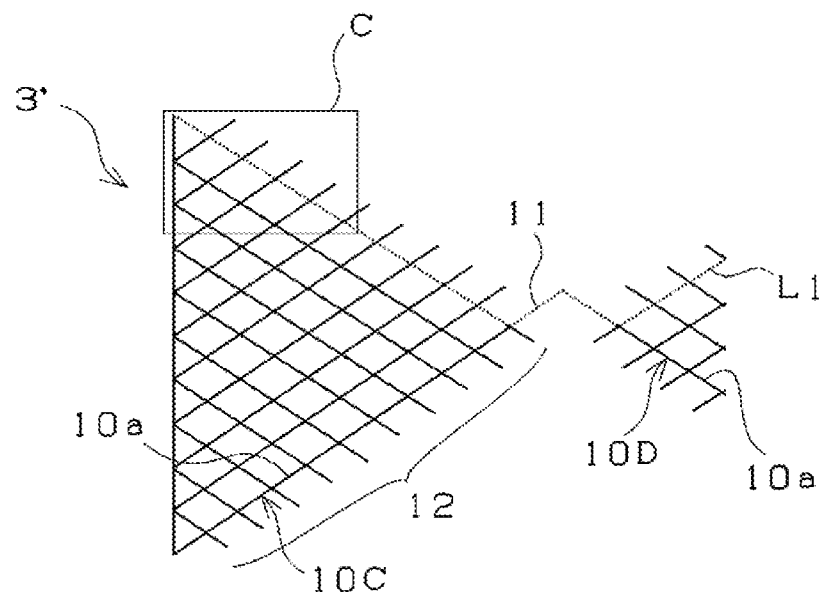
FIG. 5 is an enlarged view illustrating an end portion of the X-axis lattice in an X-axis direction of the touch panel.
Figure 6:
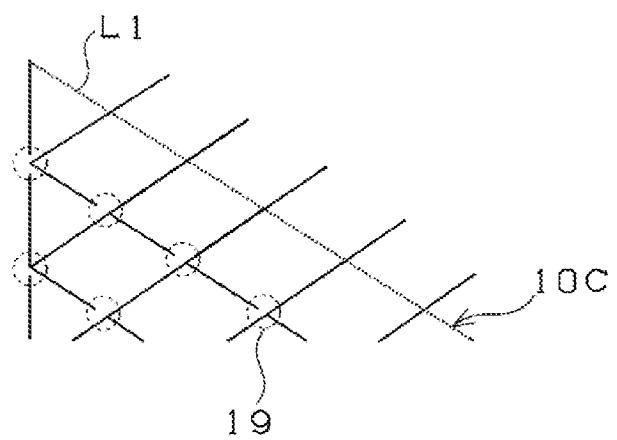
FIG. 6 is a partial enlarged view of FIG. 5.
Figure 7:
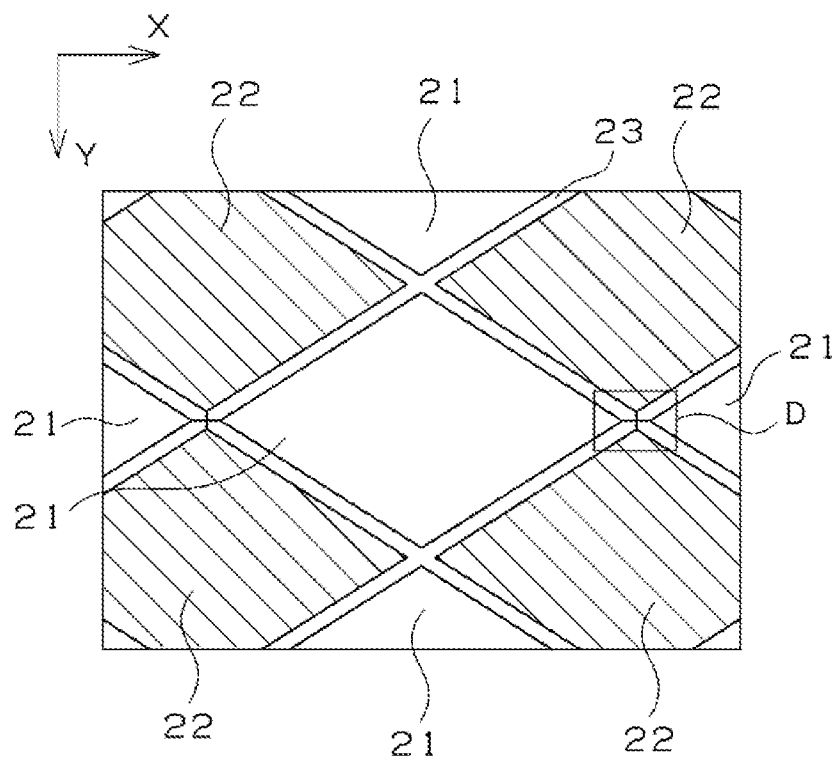
FIG. 7 is a partial enlarged view of an X-axis lattice and a Y-axis lattice of a conventional touch panel.

In a configuration shown in FIG. 5 and FIG. 6, an air bubble discharge part is formed in an X-axis sensor unit 3' in order not to seal an inside of the fine lattice. FIG. 5 shows an end portion at one side of an X-axis lattice 10C and an X-axis lattice 10D in the X-axis direction. Each of these X-axis lattices also has the protrusion part 12 protruded from the frame line 10a to the gap as described above. The X-axis lattice 10C and the X-axis lattice 10D are connected by the connection part 11 parallel to a lattice side of the fine lattice. A dotted line L1 illustrates a connection wiring that connects the X-axis lattices aligned in the X-axis direction.

FIG. 6 is an enlarged view illustrating a C-part in FIG. 5. As shown in FIG. 6, a cut part 19 in which a part of one lattice side of the fine lattice is cut is formed as the air bubble discharge part. Inner spaces of the adjacent fine lattices are communicated with each other by forming the cut part 19, and thereby the air bubble is easily discharged in the roller processing. As a result, the air bubble is prevented from being generated in the lattice, so that the transmittance can be uniform and high in a whole of the sensor area.

A cut length (opening length) of the cut part 19 on the lattice side is not especially limited, however it is preferably set to 20-50 μm. In a relationship between the cut length and a length of one lattice side, the cut length is preferably set to 1/20-1/5 of the length of the one lattice side, more preferably set to 1/10-1/6 of the length of the one lattice side.

A position of the cut part 19 is not especially limited, however the cut part 19 may be formed on a lattice side other than a lattice side forming the connection wiring L1. The cut part 19 is preferably formed such that air in an inner space of the fine lattice flows toward one side (left side in FIG. 6) in the X-axis direction. In order to flow the air smoothly, it is preferable that the cut parts 19 are continuously arranged on a straight line parallel to the lattice side.

The capacitive touch panel shown in FIGS. 1A to 1C through FIG. 6 has a configuration in which two glass substrates are laminated and the sensor units are interposed therebetween, however the capacitive touch panel is not limited to such a configuration, and therefore the capacitive touch panel may be formed by one single substrate.

The projected capacitive touch panel of the present invention has the inconspicuous sensor unit and therefore it is suitably used as an input device for appliances such as household electrical appliances, audio visual appliances, personal computer equipment, office automation equipment, industrial machines and other electronic devices.

REFERENCE NUMBER LIST

1: capacitive touch panel
2: first glass substrate
3: X-axis sensor unit

4: second glass substrate
5: Y-axis sensor unit
6: insulation layer
7: wiring
8: external connection terminal
9: flexible printed circuits (FPC)
10: X-axis lattice
10a: frame line
11: connection part
12: protrusion part
13: missing part
14: Y-axis lattice
14a: frame line
15: connection part
16: missing part
17: gap
18: opening
19: cut part
L1: connection wiring

The invention claimed is:

1. A capacitive touch panel comprising:
a glass substrate having a touch surface;
an X-axis sensor unit having patterns arranged parallel to each other, each of the patterns having diamond-shaped X-axis lattices aligned in an X-axis direction;
an Y-axis sensor unit having patterns arranged parallel to each other, each of the patterns having Y-axis lattices, each of which has the same shape as the X-axis lattice, aligned in a Y-axis direction orthogonal to the X-axis direction; and
an insulation layer arranged between the X-axis sensor unit and the Y-axis sensor unit,
wherein the capacitive touch panel is formed by the glass substrate, the X-axis sensor unit, the Y-axis sensor unit, and the insulation layer laminated to each other,
wherein the X-axis lattices and the Y-axis lattices are arranged in a matrix manner not to be overlapped with each other such that a gap is formed between a frame line of the X-axis lattice and a frame line of the Y-axis lattice, in a plane view seen from a side of the touch surface,
wherein each of the X-axis lattice and the Y-axis lattice is formed by fine lattices formed of a metal thin film,
wherein a metal thin film extended parallel to a lattice side of the fine lattice from the frame line of the X-axis or the Y-axis lattice is arranged in said gap as a protrusion part,
wherein a length of the protrusion part is set to 60-95% of the width of said gap.

2. The capacitive touch panel according to claim 1,
wherein the X-axis lattices adjacent to each other in the X-axis direction is connected by an X-axis connection part in the X-axis sensor unit,
wherein the Y-axis lattices adjacent to each other in the Y-axis direction is connected by a Y-axis connection part in the Y-axis sensor unit,
wherein the X-axis connection part is formed of a metal thin film parallel to the lattice side of the fine lattice, and
wherein the Y-axis connection part is formed of a metal thin film parallel to the lattice side of the fine lattice.

3. The capacitive touch panel according to claim 2,
wherein the X-axis lattice has a missing part in which at least a part of the lattice side of the fine lattice is missing, at a position overlapped with the Y-axis connection part in a lamination direction.

4. The capacitive touch panel according to claim 2,
wherein the Y-axis lattice has a missing part in which at least a part of the lattice side of the fine lattice is missing, at a position overlapped with the X-axis connection part in a lamination direction.

5. The capacitive touch panel according to claim 1,
wherein the metal thin films arranged in the gap are formed with the same pitch and the same line width as the metal thin films forming the fine lattices.

6. The capacitive touch panel according to claim 1,
wherein a plurality of cut parts in which a part of at least one lattice side of the fine lattice in the X-axis lattice or the Y-axis lattice is cut, is formed, so that inner spaces of the fine lattices adjacent to each other are communicated with each other.

7. The capacitive touch panel according to claim 6,
wherein the cut parts are arranged such that air in the inner spaces of the fine lattices flows toward one side in the X-axis direction or the Y-axis direction.

8. The capacitive touch panel according to claim 1,
wherein the metal thin film is an Al thin film.

* * * * *